US009152722B2

(12) United States Patent
Sahni et al.

(10) Patent No.: US 9,152,722 B2
(45) Date of Patent: Oct. 6, 2015

(54) AUGMENTING ONLINE CONTENT WITH ADDITIONAL CONTENT RELEVANT TO USER INTEREST

(75) Inventors: Saurabh Sahni, Bangalore (IN); Ian Kennedy, Alameda, CA (US); Pankaj Kothari, Bangalore (IN); Todd Sampson, San Francisco, CA (US); Emanuel Miller, Castro Valley, CA (US); John Sampson, San Francisco, CA (US); Chris Goffinet, San Francisco, CA (US); Steve Ho, Belmont, CA (US); Raymund Ramos, Pinole, CA (US); Mani Kumar, Bangalore (IN)

(73) Assignee: YAHOO! INC., Sunnyvale, CA (US)

( * ) Notice: Subject to any disclaimer, the term of this patent is extended or adjusted under 35 U.S.C. 154(b) by 66 days.

(21) Appl. No.: 12/347,882

(22) Filed: Dec. 31, 2008

(65) Prior Publication Data

US 2010/0023506 A1     Jan. 28, 2010

(51) Int. Cl.
*G06F 7/00*       (2006.01)
*G06F 17/30*      (2006.01)

(52) U.S. Cl.
CPC .... *G06F 17/30867* (2013.01); *G06F 17/30876* (2013.01)

(58) Field of Classification Search
CPC .................................. G06F 17/30876
USPC ........................................ 707/751
See application file for complete search history.

(56) References Cited

U.S. PATENT DOCUMENTS

| | | | |
|---|---|---|---|
| 2007/0061301 A1* | 3/2007 | Ramer et al. | 707/3 |
| 2007/0073845 A1* | 3/2007 | Reisman | 709/219 |
| 2007/0112792 A1* | 5/2007 | Majumder | 707/100 |
| 2008/0288641 A1* | 11/2008 | Messer et al. | 709/226 |

* cited by examiner

*Primary Examiner* — Ajith Jacob
(74) *Attorney, Agent, or Firm* — James J. DeCarlo; Greenberg Traurig, LLP

(57) ABSTRACT

A method of gathering information relevant to the interests of a user includes receiving activity history associated with the user from a network data source, where the activity history includes a description of a user action initiated by the user, generating a first metadata item based upon the activity history; and storing the first metadata item as user profile information associated with the user in a user profile database. Generating the first metadata item may include extracting text from the activity history and generating the first metadata item based upon the text. The activity history may include a description of a user action. The method may further include providing a server plugin for performing a second method in response to access of web content on a server by the user, the second method comprising retrieving a content object from the server, determining if the first metadata item is relevant to the content object, adding a web link to the web content as a reference to the content object in response to the content object being relevant to the first metadata item; and providing the web content to the user.

58 Claims, 7 Drawing Sheets

AUGMENTING ONLINE CONTENT WITH ADDITIONAL CONTENT RELEVANT TO USER INTEREST

RELATED APPLICATIONS

The present application claims priority to Indian Patent Application No. 1798/CHE/2008, entitled AUGMENTING ONLINE CONTENT WITH ADDITIONAL CONTENT RELEVANT TO USER INTERESTS, filed in India on Jul. 22, 2008, which is hereby incorporated by reference herein in its entirety.

BACKGROUND

1. Field

The present application relates generally to aggregation of content from multiple sources, and more particularly to augmenting online content with additional content that is relevant to interests of particular users.

2. Related Art

Aggregation and cross-referencing of online content hosted on multiple web sites, such as Flickr™, del.icio.us, YouTube™, and Facebook® to provide a more unified, comprehensive view of a user's online content such as blog posts, web site bookmarks, videos, and social networking information are known in the art. Lifestreaming refers to a process of collecting and storing information about a person's activities and life by aggregating online content that the person creates and consumes, such as blog posts, social network updates, online photos, and the like.

Blogs, also known as web logs, present content generated by a user. Blogs may cover a variety of subjects, and content entries are presented in reverse chronological order, thereby giving higher visibility to the latest updates. As new posts are added, the older posts become less prominent. The older posts may, for example, disappear from the main page of the web site to a visitor, but since most users view only the most visible, i.e., latest, content, older posts receive few hits.

Lifestreaming enables aggregation of user activities from multiple web sites. Users provide their usernames for web sites such as Flickr®, YouTube®, Last.fm, Netflix®, Twitter®, del.icio.us, Digg™, and the like to lifestreaming providers such as MyBlogLog™, FriendFeed™, Plaxo®, and the like. Such lifestreaming providers crawl web sites and aggregate the latest updates.

Knowledge about recent user activities across different services is not presently used to find posts of interest for a visitor. Such user activity knowledge increases the relevance significantly and enables websites to personalize content for particular users.

MyBlogLog is a network service for use by bloggers, i.e., users who maintain and author content on web log sites. A blogger may register with MyBlogLog to create a blog community for the blogger's blogs. Other users may subscribe to the blog community to receive updates from the blogs in the community. When the blogger adds content to a blog, the content may be syndicated, i.e., provided automatically, to other members of the community.

Existing techniques attempt to increase blog traffic, e.g., the number of readers and/or the time spent reading by each reader, by showing the most popular posts or content, ordinarily select interesting posts to display based upon information about all visitors to a web site or blog. However, these existing techniques do not accurately select content relevant to the interests of individual visitors.

SUMMARY

Techniques are disclosed for finding web site content, such as blog posts, which may be interesting or relevant to a user visiting the blog site. Blog posts may be, for example, textual content such as discussions, personal opinions, recommendations, links to other web sites, and multimedia content, such as photographs, videos, and the like. The technique of lifestreaming is used to identify likely relevant posts using metadata associated with a user, where the metadata is found in user generated content that may be spread across multiple web sites such as social networking sites. Online content such as blog posts may be relevant to user interests. Lifestreaming information is used to locate the blog posts and other online content that is relevant to a web site visitor.

A plug-in widget is provided that may be included by the blog web sites to show blog posts relevant to the interests of users who visit the blog site. The plug-in widget may thereby encourage visiting users to visit the web site, e.g., read the web site's content, for longer time periods. The plug-in widget may also expose older blog posts, thereby extending the life of blog posts. The plugin may add information such as relevant links to a web page that references the plugin. The plugin retrieves the interests of a user visiting the web page from a user profile and find relevant information, such as web links to related pages, to be displayed, e.g., as a list of relevant links, on the web page.

In general, in a first aspect, the invention features a method of gathering information relevant to the interests of a user. The method includes receiving activity history associated with the user from a network data source, wherein the activity history includes a description of a user action, and the action is initiated by the user, generating a first metadata item based upon the activity history, and storing the first metadata item as user profile information associated with the user in a user profile database.

Embodiments of the invention may include one or more of the following features. Generating the first metadata item may include extracting text from the activity history, and generating the first metadata item based upon the text. Generating the first metadata item based upon the text may include using a stemming method to generate a stem word based upon the text, and generating the first metadata item based upon the stem word. Generating the first metadata item based upon the text may include using a taxonomical lookup to generate a taxonomical category of the text, and generating the first metadata item based upon the taxonomical category. Generating the first metadata item based upon the taxonomical category may include generating the first metadata item, wherein the first metadata item comprises a name of the taxonomical category. Generating the first metadata item based upon the taxonomical category may include generating the first metadata item, wherein the first metadata item comprises a name of an object in the taxonomical category. The first metadata item may be a tag.

The activity history may include a description of a user action in which the user creates online content, provides online content to the network data source, shares a web link with another user, applies a tag to another user, receives online content, or a combination thereof. The method may further include generating a profile vector for the user based upon their activity history, and storing the profile vector in the user profile. The profile vector may be based upon a content object, the first metadata object, or a combination thereof.

The method may further include providing a server plugin, the plugin for performing a second method in response to access of web content on a server by the user, the second method including retrieving the user profile from the user profile database, retrieving a content object from the server on which the plugin is located, determining if the first metadata item is relevant to the content object, adding a web link to the web content as a reference to the content object in response to the content object being relevant to the first metadata item, and providing the web content to the user. Determining if the first metadata item is relevant to the content object may include generating a content vector based upon the content object, generating a profile vector based upon the first metadata item, and performing a similarity operation to compare the content vector to the profile vector. The content vector may include numeric weight values based upon the content object, and the profile vector may include numeric weight values based upon the first metadata item.

Determining if the first metadata item is relevant to the content object may include retrieving a second metadata item associated with the content object from the server on which the plugin is located, wherein the first metadata item is relevant to the content object in response to the first metadata item being relevant to the second metadata item. Determining if the first metadata item is relevant to the content object may include generating a relevance score based upon a similarity of the first metadata item to the content object, wherein the first metadata item is relevant to the content object in response to the relevance score being at least a threshold value. The threshold value may be based upon a type of the activity history.

Determining if the first metadata item is relevant to the content object may include generating a recency score based upon recency in time of a date on which the first metadata item is accessed and of a date on which the content object is accessed, wherein the first metadata item is relevant to the content object in response to the recency score being at least a threshold value. The content object may be a web page. Storing the first metadata item as user profile information may be in response to a number of times the first metadata item is generated in a defined time period being greater than a threshold value. The threshold value may be based upon a type of the activity history. The method may further include removing the first metadata item from the user profile database in response to a number of times the first metadata item is generated in a defined time period being less than a threshold value.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1:
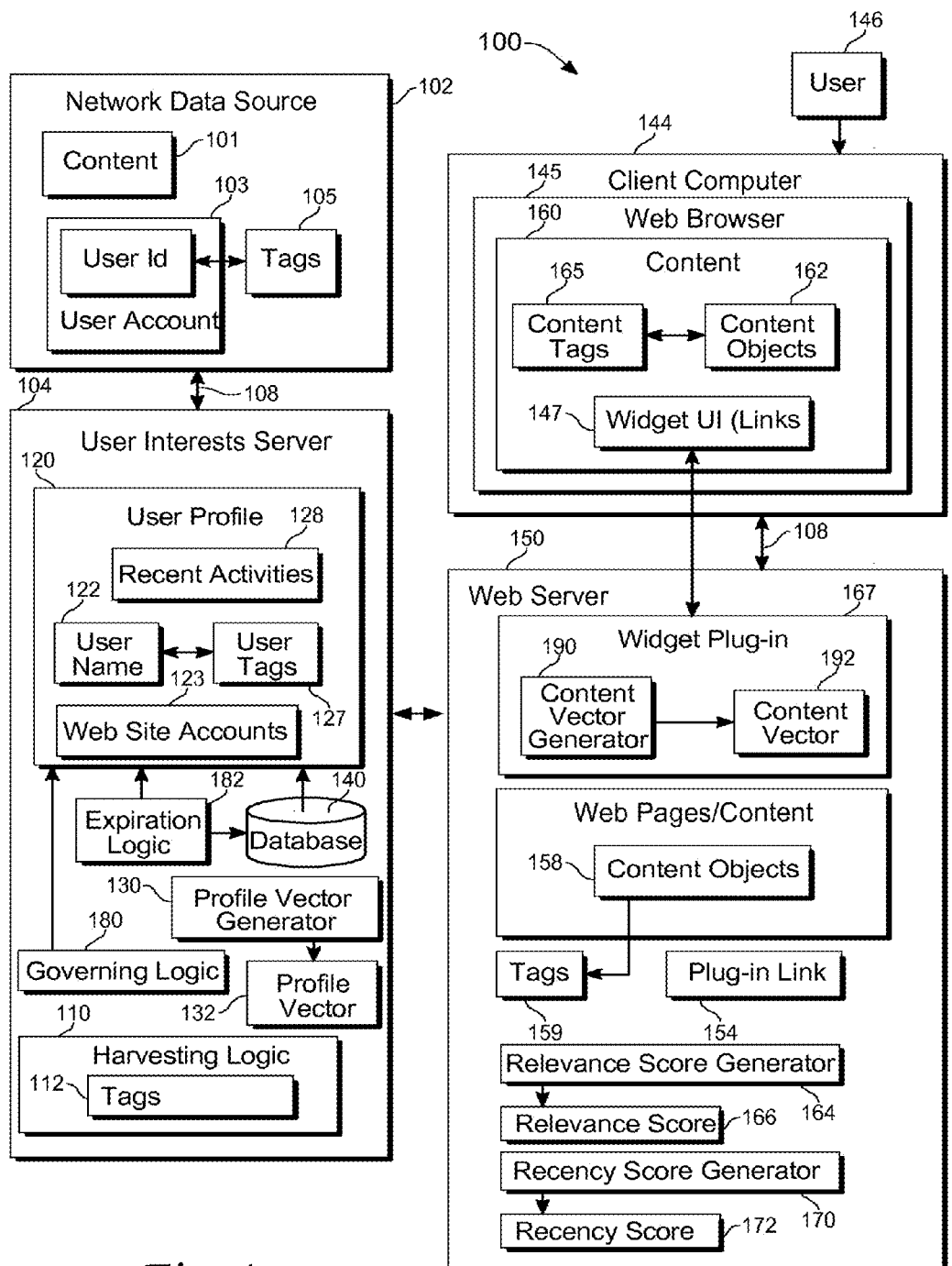
FIG. 1 illustrates a system for determining relevance of online content using personalization information in accordance with embodiments of the invention.

FIG. 1 illustrates a system for determining relevance of online content using personalization information in accordance with embodiments of the invention. An online content relevance system 100 provides features that allow publishers of online content, such as blog authors, to personalize the content according to the visitor interests. The personalization may occur automatically, so that, for example, a list of personalized links that are relevant to a visitor's interests are displayed as part of the online content. The online content relevance system 100 includes one or more network data sources 102 that provide online content 101 and associate tags 105 with user accounts 103, and a user interests server 104 that maintains a database 140 of user profiles 120. A network data source may be, for example, the Flickr® photo sharing site, the FaceBook™ social networking site, or any other online service that provides information, e.g., metadata, in association with a user name or account. Each user profile 120 includes a user name (or user identifier) 122 and user account information 123 for one or more online content providers 102. The user account information may be, for example, a list of content providers (e.g., web sites) on which the user has accounts, where the list includes a login name for each content provider that identifies the user to the content provider. The account information may include passwords, though passwords are optional, since content providers 102 may allow users to access online content without authentication.

Metadata 127, e.g., tags or the like, may be associated with the user. The metadata 127 may, for example, describe the interests of the user. For example, a user 146 may access the network data source 102 at some point and establish an account on the network data source 102. Subsequently, when the user 146 accesses other network data sources, such as a web server 150 via a client computer 144, and the network data source, e.g. a web site provided by a web server(s) 150 includes a link 154 to a widget plugin 156, the widget plugin 156 is downloaded to the client computer 144 and scans the content 160 received by the client computer 144 from the web server to identify relevant content that may be of interest to the user 146 based upon similarities or relationships between content objects 162 and the user tags 127. The content objects 162 and/or the content 160 may be received by the client computer 144 via a computer network using a protocol such as, for example, RSS (Really Simple Syndication), in which case the content objects 162 are received from the web server 150. In one example, the web server 150 may be owned and/or hosted by any publisher. Content tags 165 may also be received, e.g., via RSS from the web server 150. In another example, the content tags 165 may be determined using content analysis of the content objects 162, e.g., by selecting common search terms or words of particular types, e.g., names of people or places, from the content objects 162, or by other content analysis methods known to those skilled in the art.

As an example, if the user 146 is interested in movies, then the user name 122 that corresponds to the user 146 may be associated with the tag "movies" in the user profile 120. In one example, the metadata 127 is harvested, i.e., determined, by analyzing the user's web activities 128, i.e., sites and pages that the user visits, actions that the user performs at those sites, information that the user submits, content that the user views, and the like. A user profile 120 that includes tags 127 associated with the user 122 is generated based upon the user's activities 128. The user activities 128 are descriptions of the user's activities. The user activities, e.g., representations of the activities that the user performs, include without limitation an activity name or identifier, data associated with the activity, attributes or parameters of the activity such as time, date, and the network data source (e.g., URL of a web site). In one example, the activities 128 are online actions explicitly initiated by the user, e.g., actions such as requesting a web page, providing information in response to user input to the web browser 145, and more application-specific activities, such as sharing a web page, sending a particular type of text message, or creating a particular type of object on a web site (e.g., creating a user profile or posting a blog entry). An activity explicitly initiated by, i.e., performed by, the user is, for example, an activity that occurs as a result of a user action, such as clicking a mouse button, entering text, selecting a menu item, or the like. Activities 128 may include, e.g., requesting, viewing or creating web content. In one example, activities explicitly initiated by the user are actions, commands, or events that occur and/or appear in the user interface of the web browser 145. As a user performs actions relevant to interests, tags associated with those interests are appended to the user profile 120. For example, if a user performs multiple actions relevant to the movie Mission Impossible, e.g., viewing articles and/or other content objects that include the name "Mission Impossible", the tag "Mission Impossible" may be automatically associated with the user 122. Subsequently, when the user visits a web site 150 that has content relevant to the movie Mission Impossible, e.g., articles about the movie and/or articles that include the name of the movie, then that relevant content, or links to the relevant content, may be displayed to the user.

Content vectors or other information based on the user tags 127 may also be stored in the user profile 120 in addition to or in place of the user tags 127. In other examples, other information may be associated with the user in the user profile 120 in addition to or in place of the user tags 127. Such other information may include content object(s) viewed by the user, or portions, attributes, or properties of the content object(s), or other information based on the content object(s), such as content vector(s), generated as described elsewhere herein.

As another example, a user may have accounts on multiple network data sources 102, e.g., Flickr for photo sharing, YouTube for video viewing, Last.fm for listening to music, and so on. The user profile 120 is generated based upon content and actions associated with the user on those online services. When the user visits a third-party web site 150 that has a link 154 to a widget plugin 156, the client computer downloads and/or executes the widget plugin 156, which uses the user profile 120 to generate and present additional content that is likely relevant to the user's interests. In one example, the widget plugin 156 is downloaded to the client computer 144 from the web server 150 via the Internet. Such network communication, e.g., via the Internet, may occur between components of FIG. 1, as shown by network communication paths 108. A downloaded widget plugin (not shown) includes essentially the same computer program code as the widget plugin 156 provided by the web server 150 (e.g., as downloadable computer program code instructions), but executes on the client computer 144. The widget plugin 156 may be installed on any web server 150, and may be referenced by a link 154 in content objects 158 (e.g., a web pages) hosted by the web server. The content objects 158 downloaded to the client computer 144 are shown on the client computer 144 as content objects 162, which are essentially the same as the content objects 158 but located on a different computer.

Harvesting logic 110 crawls, e.g., queries, the network data source web site 102 identified by the user account information 123 to obtain metadata 127 from the user generated content 101 and tags 105 associated with the user-generated content 101, and available on the network data source web site 102. The metadata 127 may be, for example, tags, e.g., text strings, or topic names, e.g., "movies", or other attributes of the content objects, or portions of the content objects, or the like. In another example, the harvesting logic 110 may retrieve at least a portion of the user-generated content 101. Tags 105 may be associated with a particular user on a web site by the user, e.g., as part of a personal profile that a user creates to describe her interests, or by other users, e.g., by the user's friends. The other user may vote on the tags 105 to order the tags 105 from most relevant to least relevant. In another example, the tags 105 may be associated with a particular user 103 by an automated process that identifies tags that are likely to be of interest to the user 103 based upon content associated with or created by the user.

Figure 6:
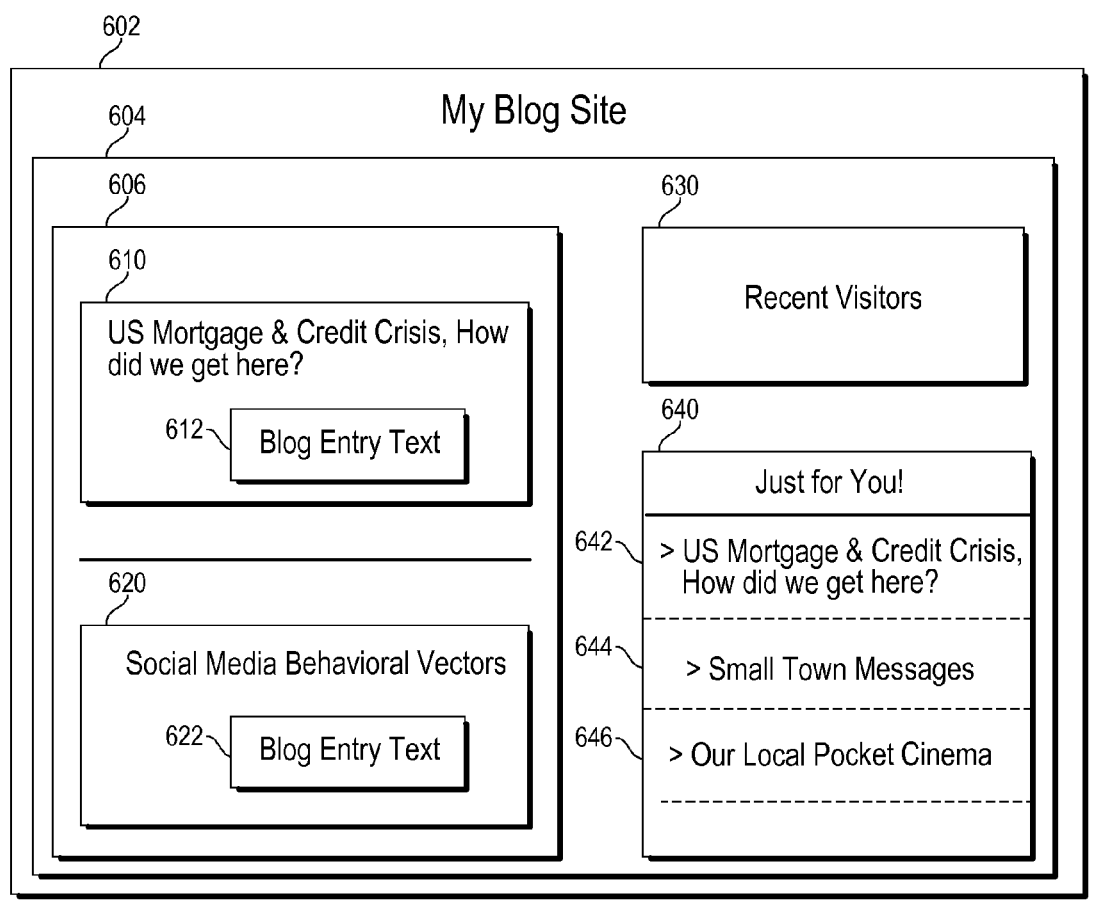
FIG. 6 illustrates a web page having a widget plugin interface that provides links to additional content relevant to the web page in accordance with embodiments of the invention.

In one example, a client computer 144 hosts a web browser 145 that displays content 160, which includes content objects 162. The web browser 145 receives the content objects 162, from the web server 150. The content objects 162 may be viewed by a user 146 using the web browser 145 executing on the client computer 144. The content objects 152 may be in Hypertext Markup Language (HTML) format or in some other computer-readable format. Each content object 152 may also include a plugin widget link 147, e.g., an HTML link, which refers to a widget plugin 167. The link 147 causes the web browser 145 to display a widget user interface (not shown) in association with the content 152 on a display device of the client computer 144. The link 147 refers to the widget plugin 167, which generates the widget user interface. The widget plugin 167 is, for example, a browser plugin implemented as computer program code in a language such as C, C++, Java®, JavaScript™, or the like. The widget plugin 167 communicates with the user interests server 104 via a network, e.g., the Internet. In other examples, the user interests server 104 may be located on the web server 150, or on the client computer 144. The components of the network data source 102, the user interests server 104, the client computer 144, and the web server 150 may be divided differently among computer(s) than shown in FIG. 1. FIG. 6 shows an exemplary display view 640 of the widget user interface. The display view 640 is displayed, for example, to a user 146 on a display screen of the client computer 144.

In one example, the widget plugin 167 identifies content of interest to the user 146 by identifying the user and retrieving the user profile 120 of the user from the database 140 of the user interests server 104. The widget plugin 167 may be implemented using, for example, as a WordPress® plugin, and may access MyBlogLog™ Application Programming Interfaces (APIs), which allow for storage and retrieval profile and metadata information associated with users. In one example, the widget runs in a sidebar of a website as a result of the web site owner or administrator placing appropriate JavaScript™ code in a template or HTML file of the web site content 152 on the web server 150. If a registered MyBlogLog user 146 visits the widget-enabled web site, a cookie is placed on the client computer 144. Subsequently, the JavaScript code provided by the web site 150 interacts with the cookie, and adds an Avatar sidebar for the widget 167. In one example, if a user 146 is not a MyBlogLog member, the system uses attributes of the past 5 (or some other number of) MyBlogLog members who have visited and makes an educated guess as to what topics or tags are relevant to the unregistered user. In one example, relevance of content 101 to user characteristics such as metadata 127 and/or activity history 128 is determined by generating a content vector 192 and a user profile vector 132, and comparing the vectors using a similarity detection technique such as cosine similarity detection. The content vector 192 may be based upon tags associated with the content object 158, or upon at least a portion of the content object 158 itself (e.g., the content), or upon values derived from the content object, e.g., statistical information derived from the content object. Other similarity detection techniques include Jaccard similarity, bi-gram similarity, min-hash similarity, and the like. The profile vector 132 may be based on metadata 127 such as tags, and/or activity history 128 associated with a user, as described below.

As an example of a cosine similarity detection technique, suppose there is a sentence in which the word "idea" occurs 10 times, "patent" occurs 5 times, and "activity" does not occur. This sentence may be represented as a point (10, 5, 0) in 3-dimensional space. The content vector is a line joining the origin (0, 0, 0) and the point (10, 5, 0). Suppose there is another sentence in which "idea" occurs 8 times, "patent" does not occur, and "activity" occurs 3 times. The content vector of this second sentence is a line joining the origin and (8, 0, 3). The cosine similarity of the content vectors of the two sentences is the cosine of the angle between these two lines. The smaller the distance between the lines, the greater the overall similarity between the lines. Cosine similarity increases as the number of words that two content objects have in common increases, and as the frequency of words in the first object becomes closer to the frequency of the same words in the second object.

A profile vector generator 130 creates a profile vector 132 based on metadata 127 and/or activity history 128 associated with a user profile 120. The tags 127 are associated with the user as a consequence of being present in the user's profile 120. The particular tags 127 are determined based on, for example, a user's web browsing behavior and content that the user uploads to the Internet. The activity history 128 may include, for example, web browsing activity, online content that the person creates and consumes, such as blog posts, social network updates, online photos, and the like. Each of the tags 127 may be, for example, a text string of one or more words, and may correspond to a topic or subject, or may have any other meaning implied by the tag. Creators and consumers of content 101 such as articles may tag the content with one or more tags, and any type of content on a web site may have an associated tag or topic.

In one aspect, the profile vector 132 represents the interests of the user who corresponds to the user profile 120. The metadata 127 may be, for example, semantic tags, which are words or multi-word phrases that indicate an interest of the user, e.g., the tag "movies" may be included in a user's metadata 127 to indicate that the user 146 that corresponds to the user profile 120 is interested in movies. User may apply tags to their own online identities, or other users may apply tags to a user. The tags applied to a web site may be stored on the web site or Users may vote for a tag, e.g., to show their interest in the topic or thing represented by the tag. In one example, the tag is displayed in a size, e.g., font size, which is proportional to the number of people who have voted for the tag.

Furthermore, in one example, a vector space model is used to represent each content object 162 (e.g., blog post, news item, or other item of online content) as a content vector 192 of (term, weight) pairs in a multi-dimensional space. The value of each dimension is generated by a content vector generator 190 that executes on the web server 150. The content vector generator 190 generates the value of each dimension based on the words occurring in the content object 162. The content vector 192 may be stored on the web server 150.

In one example, the web server 150 also includes a relevance score generator 164, which determines a relevance of content objects 158 (e.g., blog posts) to the user profile 120, and, in one aspect, to the user profile metadata 127, by applying cosine similarity or another similarity detection technique to compare the content vector 192 of each content object 158 to the profile vector 132. As introduced above, the content vector 192 may be based upon tags associated with the content object 158, or upon at least a portion of the content object 158 itself (e.g., the content), or upon values derived from the content object, e.g., statistical information derived from the content object. Other similarity detection techniques include Jaccard similarity, bi-gram similarity, min-hash similarity, and the like. In another example, the relevance score 166 may also be calculated by comparing explicit tags associated with the content objects 158 to user profile metadata 127, e.g., by using string comparison operations to identify similar or identical tags, e.g., strings of characters present in both the content objects 158 and the metadata 127. A determination may then be made of whether the metadata 127 is relevant to the content object(s) 158 by comparing the relevance score 166 to a threshold value, e.g., on a scale of 0 to 100, a threshold relevance score of 75 may be established based upon techniques known to those skilled in the art, such as search result ranking techniques. Then, if a relevance score is at least the threshold value, e.g., at least 75, the metadata 127 is considered relevant to the content object(s) 158.

In one example, the identified tags may then be used to identify content or configure personalization settings. For example, heavy activity around the tag "Mets" would result in personalization of a site to favor content and advertising associated with the baseball team "Mets" instead of, for example, generic "front page" content. As another example, if a first blog post has the tag "Soccer", and a second blog post has the tags "Soccer" and "David Beckham", and a user is tagged with both "Soccer" and "David Beckham", then the second blog post has greater relevance to the user's aggregate metadata than the first blog post. In another example, the widget plugin 167, which executes on the client computer 144, may invoke the relevance score generator 170 to generate the relevance score 166 in response to a user receiving a web page from the web server 150, and the score 166 may be based upon a comparison of a user's activity history 128 to content objects 158 and/or tags 159. The widget plugin 167 may include the relevance score generator 170, so that the relevance score generator 170 executes on the client computer 144.

Furthermore, a recency score 172 may be calculated by a recency score generator 170 for each of the content objects (e.g., blog posts) 158, based on the age of the content object 158. Content objects that are less recent may be considered less relevant. In one example, the recency score may be used independently of the relevance score to determine if a metadata item, e.g., a user tag, is relevant to a content object. In this example, a threshold recency value may be established, and if the recency score of a particular metadata item is greater than the threshold value, then the metadata item is considered relevant to that user. The threshold recency value may be based upon a configuration parameter, or based upon a user preference that indicates the time period of the user's interest in the content object. The threshold value may also be based upon information about the average duration of user interest in content objects.

In another example, a weighted sum of recency and relevance scores may be used to find the most interesting of the content objects 158 for the user 146. The weights for each recency and relevance score may be modified by the publisher of the content 158 as a configuration option to more strongly favor relevancy or recency in determining the interestingness of a post to the user 146. If the interestingness of a particular post is greater than a threshold value, or is one of a threshold number of highest-ranking interestingness values for the user on the blog, then the blog post is deemed of interest to the user, and is, in one example, displayed on the content or web page 160, e.g., in the user's browser 145, as one of a threshold number of blog entries that are likely to be relevant to the content objects 162.

As an example, suppose that two users, Alice and Bob, are residents of San Francisco. Bob frequently blogs (i.e., writes blog entries on his blog site) about Web 2.0 and social media, and sometimes about San Francisco. Alice recently posted a video on the YouTube™ video sharing web site and photos on the Flickr™ photo sharing web site, both tagged San Francisco. Also, Alice's profile on the LinkedIn™ social networking web site suggests that she is a doctor. Alice blogs about San Francisco, medicines, and related topics. Bob posted a comment in a recent post related to San Francisco on Alice's blog. The URL of Bob's blog was included in Bob's comment, and Alice curiously clicked on the URL to find content of interest to her on Bob's blog. However, most of Bob's recent posts are related to Web 2.0, with only some of Bob's older posts being related to San Francisco. The older posts are not shown on Bob's blog unless they are specifically requested, e.g. by following web links to older posts or by searching for older posts that contain the words San Francisco. Alice does not see the older posts when she visits the main page of Bob's blog, and consequently does not see any content of interest. The widget 156 may be added to Bob's blog site to solve this problem. More specifically, Bob's blog may include a plugin link 154 in the blog content, e.g., in an HTML page that contains the blog content. The plugin link 154 causes the web site to display posts relevant to the visitor's interests. These relevant posts may be displayed, for example, on a side portion of the web page. The posts relevant to Alice's interests (San Francisco) are made more visible, e.g., highlighted, by the widget, allowing Alice to quickly spot Bob's older San Francisco-related posts that interest her.

In another example, suppose that Netflix® web site interfaces (APIs) are used to determine that Bob has a tendency to rent movies starring Tom Cruise. Furthermore, Bob has been listening to songs from the movie Mission Impossible 3 on the Last.fm music site and has also recently rated a trailer of that movie as a favorite on the YouTube video site. Bob visits Alice's blog, which includes movies and music reviews. Blog posts on Alice's blog that are relevant to movies that star Tom Cruise are highlighted and shown on Alice's blog by the widget 156 in response to Bob visiting Alice's blog. As another example, the widget 156 may similarly highlight reviews of James Bond movies to another user Harry whose user profile indicates an interest in James Bond.

Additionally, the metadata 127 may be used by publishers, other than bloggers, to personalize the content for the visitors. Publishers providing content relevant to different subjects like news stories, reviews, etc., may highlight content that matches the user metadata derived from the user's lifestream.

A user's identified interests may change over time. In one example, a decay threshold is applied to the user-tag associations. The decay threshold indicates a minimum time duration, after which a user-tag association may be deleted if the user does not engage in any activities relevant to the tag during the time duration. For example, if a user is associated with the tag Phish, but the user stops listening to "Phish" music for several weeks, then the association between the user and the Phish tag is deleted, because the amount of time that has passed since the user engaged in any actions relevant to Phish is greater than the decay threshold. If a user uploads five photos tagged with Hawaii and listens to six songs tagged with Hawaii this week, then the tag "Hawaii" will be associated with the user, e.g., by storing the tag in the user's profile. If six months then pass in which the user has not engaged in any activities relevant to Hawaii, and the decay threshold is less than six months, then the Hawaii tag will be removed from the user's profile.

In one example, the user interests server 104 includes governing logic 180 that imposes a minimum number of times that an association should be detected (in another words, a minimum number of times that an association between a particular user and a particular harvested metadata item (e.g., tag) 127 should be attempted, before an association will be established between the user and harvested tag 127. If the threshold is exceeded, then the harvested tag 127 is written to the user's profile 120 to establish an association between the user and the tag 127. For example, a threshold may specify that if a user listens to fifty songs by the band "Phish" then the tag "Phish" will be written to the user's profile. The threshold may be associated with a particular type of content object, as well as with a particular user and/or particular tag. As another example, a threshold may specify that if a user selects or views ten blog posts that are tagged with the tag "Phish", then the tag "Phish" is to be associated with the user. A per-tag threshold may specify that if a user listens to six songs by the band "Metallica", then the tag "Metallica" is to be associated with the user.

In one example, expiration logic 182 may remove a tag 127 from the user profile 120 in response to the age of the tag, i.e., time since the tag was added to the user profile 120), being greater than a maximum age threshold. For example, if a user stops listening to "Phish" for twenty-one days, and the maximum age threshold is twenty days, then the expiration logic 182 removes the tag Phish from tags 127 associated with the user 121.

Content presentation logic, e.g., the widget plugin 156, gathers metadata about a user, and metadata about articles on the web site, and presents the "intersection", i.e., common portions, of the two sets of metadata in a widget user interface 145 as, for example, a list of web links. A content object, e.g., a link to a relevant web page, may be presented to a user when the user opens, i.e., retrieves, a web page if a first tag associated with the content object is substantially equal to, or is likely to be relevant to, a second tag associated with the user. In other words, if at least one of the variations of a tag associated with the content object matches at least one of the variations of a tag associated with the user, then the content is considered likely to be relevant to the user and may be presented to the user.

In one example, a first tag matches a second tag if the tags have the same value or can be normalized to the same value. Normalization may include, for example, converting letters to lowercase, removing whitespace characters, and the like. For example, if a content object such as a video is associated with the tag "action adventure", and the tag "action adventure" is also associated with a user, then that video may be presented to that user because the (first) tag associated with the content matches the (second) tag associated with the user by having the same value.

In one example, a content object 162, e.g., a web page, blog post, or the like, may be presented to a user if the content object 162 is likely to be relevant to the user, e.g., relevant to a tag or activity history associated with the user. The determination of whether a content object 162 is relevant to a user may be made by, for example, cosine similarity detection, Jaccard similarity, bi-gram similarity, min-hash similarity, and other methods known to those skilled in the art. The similarity detection techniques may be applied to attributes of the objects, to the tags, or to both. For example, the text content of an object may be used to generate a content vector for the object. Properties or attributes of the content object, such as category information, type information, size, modification date, access history, and the like, may also be used to generate a content vector for that object, and the content vector may be used to compare the similarity of the object to other objects or to profile vectors associated with users to evaluate the relevance of the content object to another object or to a user, respectively.

As introduced above, in one example, a content object 162, e.g., a web page, blog post, or the like, may be presented to a user if a first tag associated with the content object 162 is not the same as, but is likely to be relevant to, a second tag associated with the user. The determination of whether a metadata item, e.g., a tag is likely to be relevant to another metadata item, e.g., another tag, may be made by a defined procedure or method, and may be based on, for example, the metadata items or tags themselves, or a database of equivalent items, tags, or words, and/or the piece of content. The "relevant" relation may be extended transitively from the tag by finding relevant tags, and/or extended from the content, by finding tags that are likely to be relevant to the content, until the extensions from the tag and the extensions from the content reach a common value, e.g., the same tag. A tag may therefore be found to be likely to be relevant to a content object even if the tag is not present in the content object. For example, if a first tag "art" is mapped to a second tag "artist" by a stemming technique (as described below), and a content object contains the word "Picasso's art", then the tag "artist" may be identified as relevant to the content object by deriving the tag "art" from "artist" through stemming, and by extracting the term "art" from the content object. Since the term "art" is present in both the tag and the content object, the tag is relevant to the content object. The term "likely" is used to indicate that the "relevant to" relation is an approximation of a semantic relation. Two items may be found to be relevant to each other even if the average person would not consider them to be related or relevant to each other. However, the technique for finding relevant items should attempt to minimize the number of such false positive relations. Other techniques for evaluating relevance are may be used, e.g., using dictionaries, tables of synonyms, linguistic rules, tables of semantically related words, and the like to find words relevant to a given metadata item. Relevance may also be evaluated by generating numeric vectors based on content, metadata, and other information about users, as described below.

As introduced above, in one example, tags relevant to a given piece of text or tag may be generated by a stemming technique, as known to those skilled in the art. The stemming technique may be used to generate variations of a content object or of the first and/or second tags, where each such variation is treated as equivalent to the original text or tag for purposes of determining whether a content object should be presented to the user. Note that content objects and tags may both contain text, so the techniques for generating variations of text may also be applied to content objects, tags, and other types of objects that include text. Stemming is used to generate morphological variants of tags, where the variants have similar meanings and share a common root word. For example, if a tag is "music", stemming may produce the variants "musician" and "musical", so that, for example, online content associated with the term "musician" will be considered to be relevant to a user associated with the tag "music". Conversely, online content associated with the term "music" will also be considered to be relevant to a user associated with the term "musician". As another example, given the word "musician", stemming may produce the variants "music" and "musical". Accordingly, online content associated with the term "music" will be considered to be relevant to a user associated with the term "musician", and vice versa.

In another example, metadata items may be generated based upon a taxonomical category of the text or tag identified by a taxonomical lookup may be used to generate a taxonomical category, e.g., by mapping the text to a directory of information categories. A metadata item, e.g., a tag, may then be generated based upon the taxonomical category. For example, a directory may map the text "bicycle" to the category "human powered", which is a subcategory of the category "transportation". In that example, generating metadata items using the name(s) of each category produces the metadata items "human powered" and "transportation". In another example, metadata items may be generated based upon names of other objects in the category, e.g., if the "human powered" category includes "unicycle", the metadata item "unicycle" is generated.

In another example, a relation determination method may use a term extraction technique to generate alternate tags based upon text of the content object. Term extraction may be performed using, for example, a search term extraction method such as the Yahoo! Term Extraction Web Service, which provides a list of significant words or phrases extracted from a content object. For example, if a web page includes the text "Picasso was a painter," then the search term extraction may select the terms "Picasso" and "painter" as terms that are likely to be of interest or have specific meanings. The extracted terms would then be used as tags, so that "Picasso" and "painter" would be tags relevant to the content. The techniques for finding related items, such as stemming, taxonomical lookup, and term extraction, may be combined and/or repeated to generate additional related items.

Figure 2:
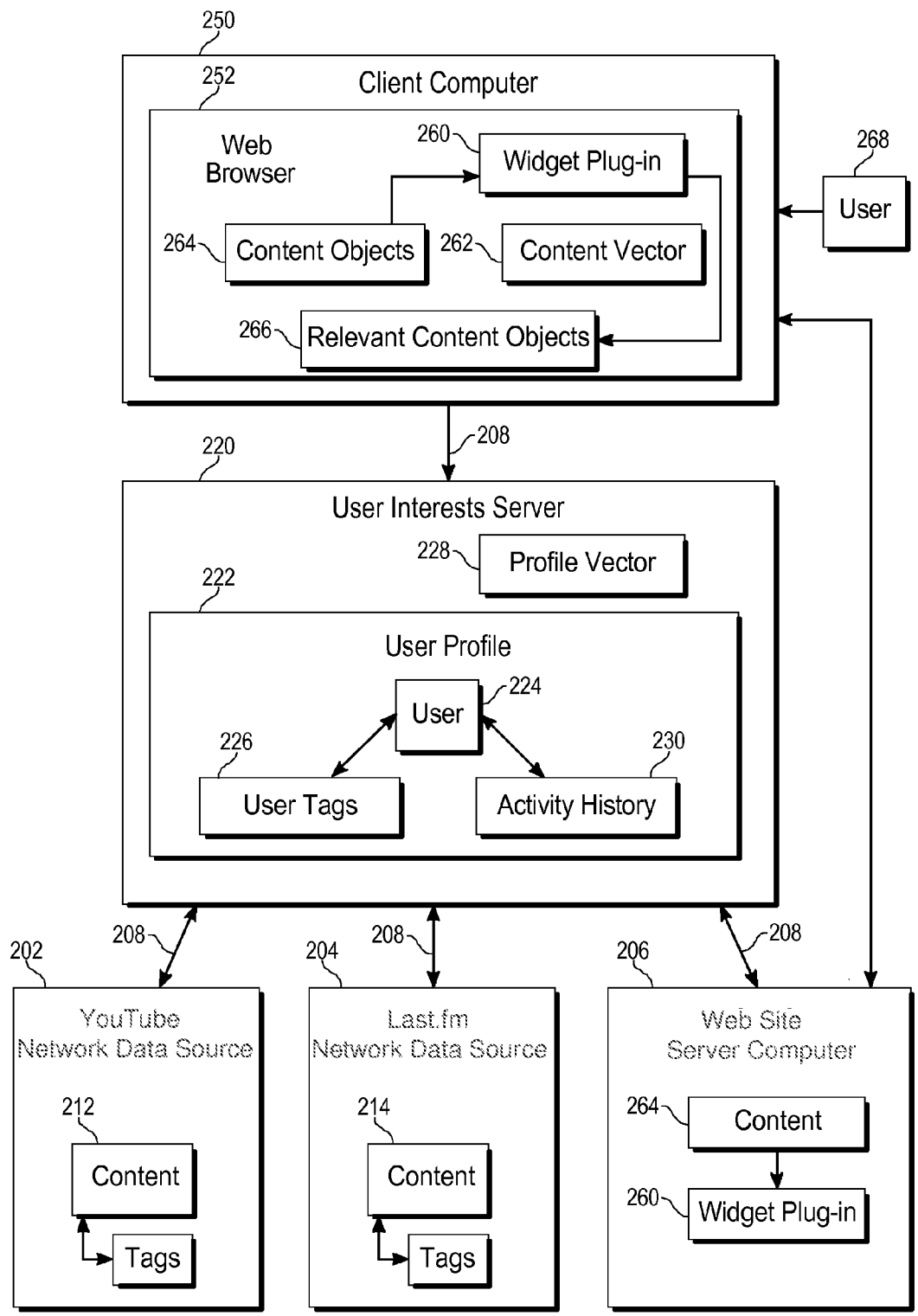
FIG. 2 illustrates a system for determining relevance of content objects using personalization information in accordance with embodiments of the invention.

FIG. 2 illustrates a system for determining relevance of content objects using personalization information in accordance with embodiments of the invention. FIG. 2 shows network data sources 202, 204, which may be, for example, web servers, or other network services providers that communicate with a user interests server 220 via a computer network such as the Internet. Such network communication may occur between the components of FIG. 2, as shown by network communication paths 208. The user interests server 220 is similar to the user interests server 104 of FIG. 1.

In one example, a client computer 250 communicates with the user interests server 220 and the other online services 202, 204 via a computer network 208, such as the Internet. The online services 202, 204 may be, for example, the YouTube™ video-sharing service, the Last.fm™ social music sharing service, the FaceBook™ social networking service, the Twitter® micro-blogging service, and the like. The client computer 250 executes a web browser 252 for displaying content objects 264, e.g., blogs, blog postings, photos, videos, web pages, news articles, and any other content objects received from the online services 202, 204, and for receiving user input and sending user requests to the online services. In this example, a user 268 interacts with the web browser 252 and has requested content objects 212, e.g., blog posts, from the personal blog 202. In one example, the widget plugin 260 is downloaded onto the client computer 250 from a web server 206 via the computer network 208 when, for example, a user receives content 264 from the web server 206. The web server 206 finds relevant content 264 and returns the relevant content 264 to the client computer 250. The content 264 includes a reference to the widget plugin 260. Upon being downloaded, the widget plugin 260 executes in conjunction with the web browser 252, e.g., as a plugin of the web browser. 252. The widget plugin 260 communicates with the user interests server 220 via the computer network 208. The widget plugin 260 displays a widget user interface that shows relevant content objects 266. The widget plugin 260 retrieves the relevant content objects 266 from the web server being visited by the user 268 based upon the metadata 226 and/or recent activity history 230 stored in the user profile database 222. The details by which the metadata and recent activities are retrieved from the online services and requested by the plugin 260 from the user profile database are described in more detail elsewhere herein. The client computer may also include a content vector 262 generated based upon the content objects 264 that may be used to compare the other relevant content objects 266 with the user information (i.e., with the metadata or tags 226 and the recent activities 230) by performing a similarity detection operation on the content vector 262 and the profile vector 228, as described elsewhere herein.

The user interests server 220 provides features for determining relevance of content objects 264 to a user's interests using personalization information and user profiles 222. The server 220 identifies relevant content 266, i.e., content that is relevant to the known interests of a user. In one example, each of the user profiles 222 includes a user name or identifier 224 associated with metadata 226, e.g., tags or the like. The user name or identifier 224 is also associated with a list of recent activities 230, which may be, for example, URL links of web pages visited by the associated user 224. In one example, a profile vector 228 is calculated as described above with reference to FIG. 1 and included in the user profile 222. In other examples, the profile vector may be calculated at other times, e.g., when it is needed by the widget plugin 260. In still other examples, the profile vector 228 is not present, and a different technique is used to determine relevance, e.g., string comparison, and to identify the relevant content 266. The user interests server 220 communicates with other services 202, 204 (e.g., web servers that have defined interfaces with which MyBlogLog is compatible), including Flickr, del.icio.us, YouTube, Digg, and the like. The services 202, 204 are treated in essentially the same way by the user interests server 220 in some aspects, e.g., user metadata 226 and/or recent activities 230 may be retrieved from any of the services, and the widget plugin 260 may also retrieve content objects from any of these services when identifying relevant content objects. The set of services 202, 204 described herein is provided as an example, and any combination of these or different online services is possible, as long as the online services accept requests from the user interests server 220 or a similar component, provide metadata and/or recent activity information for a user, and provide content objects requested (e.g., by the widget plugin 260) for a specified metadata tag or other lookup key.

Figure 3:
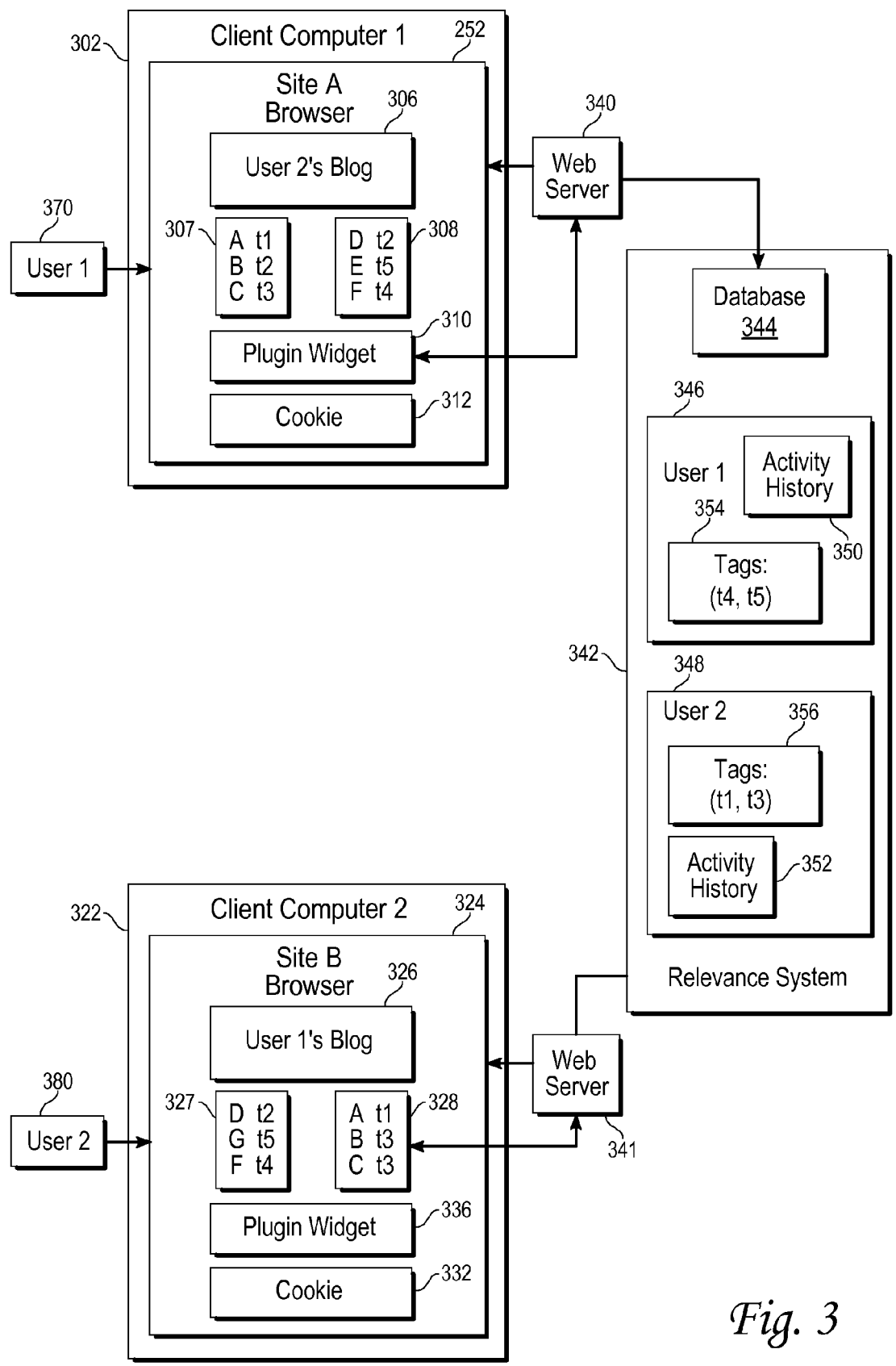
FIG. 3 illustrates an example scenario in accordance with embodiments of the invention.

FIG. 3 illustrates an example scenario in accordance with embodiments of the invention. The scenario occurs in a system 300 for identifying content relevant to a user. The system 300 includes a first user 370 using a client computer 302, a second user 380 using a second client computer 322, a first web server 340, a second web server 341, and a content relevance system 342 that includes a database 344. The first client computer 302 includes a web browser (not shown) displaying a page of a Site A 304. The display shows the second user's Blog 306, which includes content objects A, B, and C. Those content objects are tagged with tags t1, t2, and t3, respectively. The first client computer 302 also includes a plugin widget 310 and a cookie 312 for the first user. The cookie 312 indicates that the first user 370 has visited Site A 304. The plugin widget 310 has requested relevant content objects for the first user 370 from the enhanced content relevance system 342, and the content relevance system 342 has returned three content objects, D, E, and F, which are tagged with tags t2, t5, and t4, respectively. The tags were applied at some previous time. The content object D was retrieved (as relevant) because the first user is viewing a content object B with the same tag t2. Because both B and D are tagged with the same tag, B and D are relevant, and D may be of interest to a user who is interested in B. The content objects E and F were retrieved because the first user's metadata 354 in the database 344 includes tags t4 and t4, which indicates that the first user 370 is interested in tags t4 and t5.

The second client computer 322 includes a web browser (not shown) displaying a page of a Site B 324. The display shows the first user's Blog 326, which includes content objects D, E, and F. Those content objects are tagged with tags t2, t5, and t4, respectively. The second client computer 322 also includes a plugin widget 330 and a cookie 332 for the second user. The cookie 332 indicates that the second user 380 has visited Site B 324. The plugin widget 330 has requested relevant content objects for the second user 380 from the enhanced content relevance system 342, and the MyBlogLog service 342 has returned three content objects, A, B, and C, which are tagged with tags t1, t2, and t3, respectively. The tags were applied at some previous time. The content objects A and C were retrieved (as relevant) because the second user's metadata 356 in the database 344 includes tags t1 and t3, which indicates that the second user 380 is interested in tags t1 and t3. The content object B was retrieved because the second user is viewing a content object D with the same tag t2. Because both D and B are tagged with the same tag, D and B are relevant, and B may be of interest to a user who is interested in D.

Figure 4:
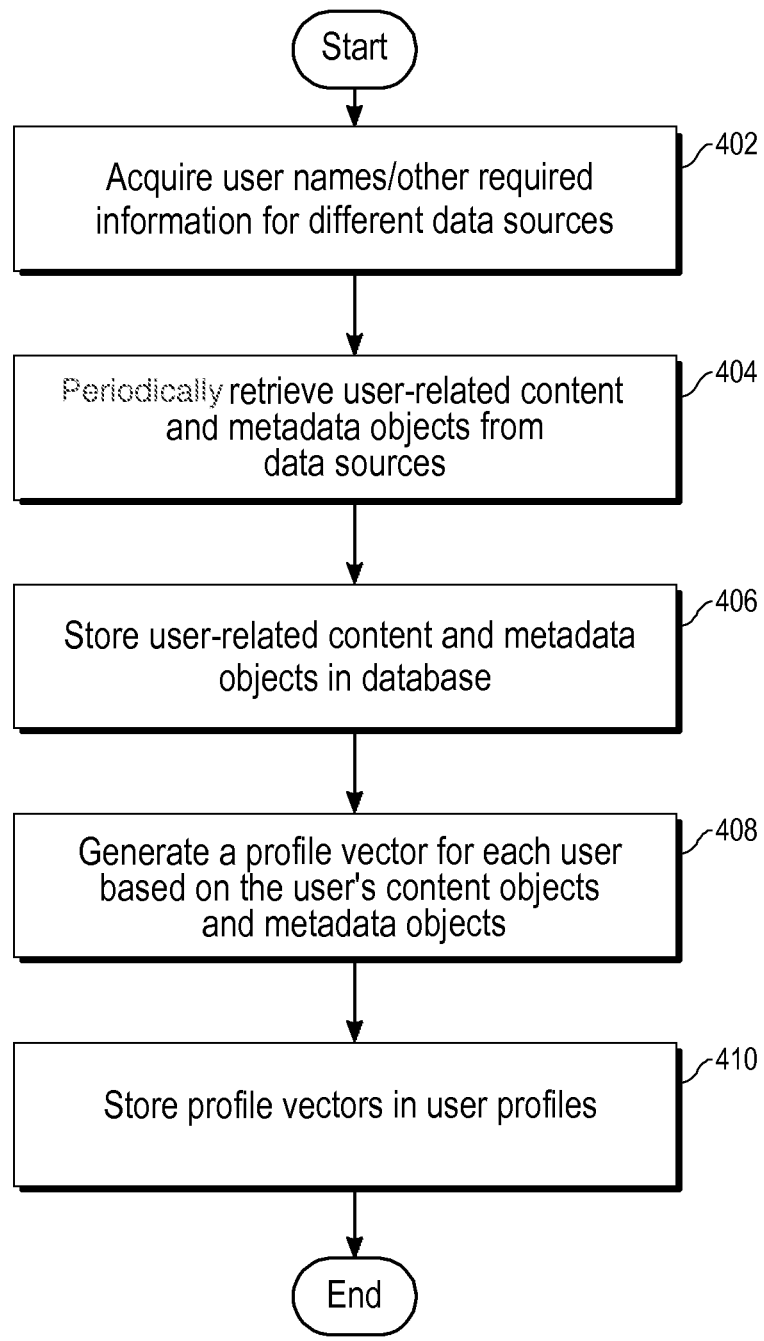
FIG. 4 illustrates a method of harvesting online content in accordance with embodiments of the invention.

FIG. 4 illustrates a method of harvesting online content in accordance with embodiments of the invention. The method of FIG. 4 may be invoked, for example, periodically, to harvest user information from online services such as web sites. Block 402 acquires user names or identifiers and other information expected by different data sources, e.g., afrom, for example, a user's profile. A web site address and optional login information may be retrieved for an online service account, e.g., a Flickr, YouTube, del.icio.us, Digg, or other account. If the web site expects users to login, e.g., to provide identity information such as a user name in a login procedure, then block 402 logs into the web site by supplying the identity information. Block 402 may also use a user-provided password if the web site expects a password. Block 404 periodically retrieves user-related content and metadata objects from data sources such as web sites, RSS feeds, and the like. The user metadata may include, for example, tags associated with the user's recent activity on the online service. The user metadata may also include records of recent activity, which may be, for example, browsing particular web sites, or interactions with particular web sites. As an example, block 404 may retrieve a list of favorite web site of a user named Ian by retrieving a web page that lists the user's favorite sites from the del.icio.us web site. The web page may be retrieved from a URL that includes the user's name, e.g., http://del.icio.us/iankennedy, which is a del.icio.us profile page of the user Ian, which lists web sites recently bookmarked by Ian. The details of the information retrieval protocols for particular online services are implemented by computer program code that is executed at block 404. Block 406 stores the user-related content and metadata objects in a database, e.g., in the user's profile. Block 408 optionally generates a profile vector for the user. The profile vector numerically represents the user information and is based on content objects and metadata objects associated with the user, such as the objects retrieved in block 404. Block 410 optionally stores the user information and the optional profile vector (if present) in a user interest profile database, such as a MyBlogLog account.

Figure 5:
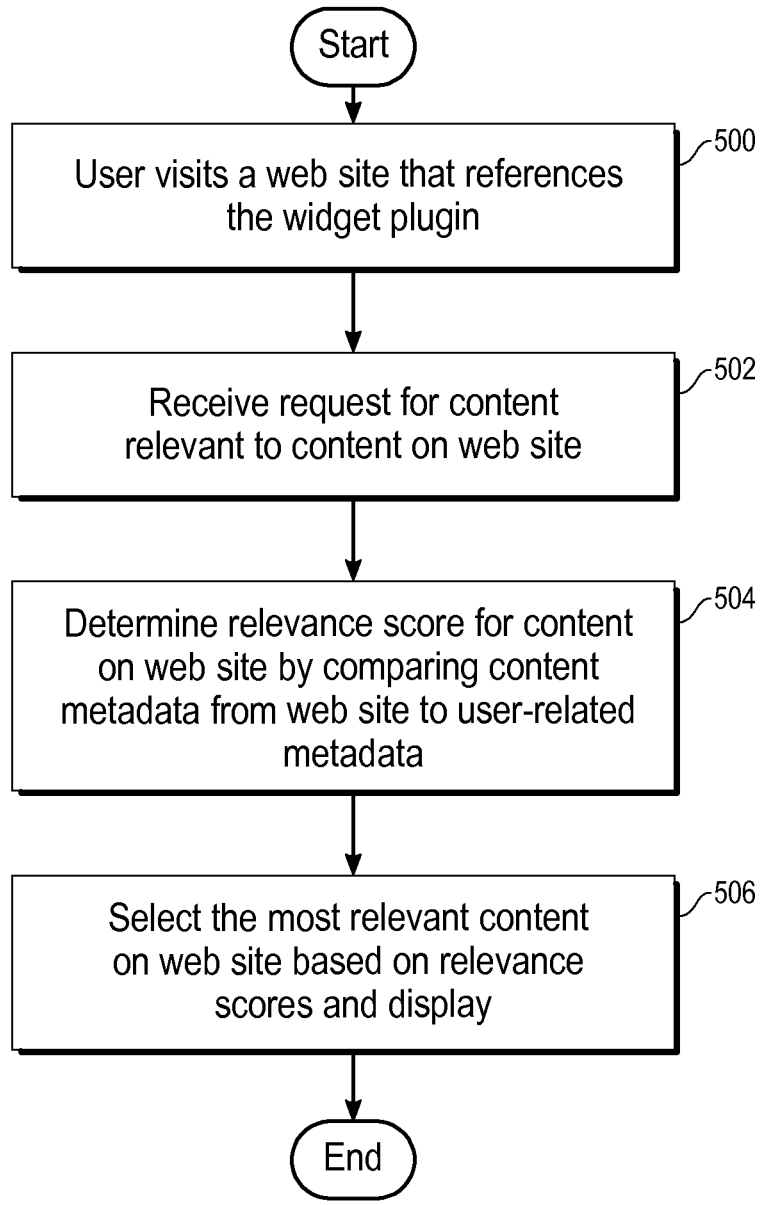
FIG. 5 illustrates a method of identifying content relevant to a user in accordance with embodiments of the invention.

FIG. 5 illustrates a method of identifying content relevant to a user in accordance with embodiments of the invention. The method of FIG. 5 is executed, for example, by a plugin widget when the user visits a web site that references the widget, to construct a list of content objects, pages, or sites that are likely to be of interest to the user. Block 500 is included to illustrate the context in which the method is and does not necessarily perform any operations. Block 500 indicates that the method is invoked in response to a user visiting a web site that references a widget plugin such as the plugin 156 of FIG. 1. Block 502 receives a request for content relevant to the site being visited. The site being visited (e.g., the site currently shown in the browser), may be, for example, a blog site, or other content provider site. Block 502 acquires content objects such as blog posts from the site being visited, if the user visiting the web site has a corresponding entry in the user profile 120 of FIG. 1. If the user does not have a user profile entry, block 502 may use information based on previous requests to select objects that may be of interest to an ordinary user. Block 504 determines relevance scores for the content objects (e.g., blog posts, news articles, and the like) retrieved from the site being visited by comparing content information (from the content object) to user information, which may be retrieved from a user information profile database, such as MyBlogLog. Block 504 optionally generates or retrieves a content vector for the content object (e.g., blog post) acquired in block 502. The comparison may be performed using a cosine similarity technique, or other numeric similarity technique on the content vector and profile vector. In other examples, the comparison may be performed by a string comparison of tags (or content text) associated with the content objects to tags of interest to the user or the user's activity history. In one example, if few tags are associated with the user, a lookup table may be consulted to determine synonym tags or relevant tags for the tags associated with the user, and the synonym or relevant tags may be used in the relevance calculation. In other examples, a set of tags may be generated, e.g., based upon a default set of tags, or based upon information in the user's profile. Block 506 selects content objects having the greatest relevance scores (as determined by, for example, the similarity technique), and displays those content objects in the widget display area of the web browser window, e.g., in a sidebar adjacent to the content objects displayed in the browser. The greatest relevance scores may be selected by choosing a predetermined number of content objects (e.g., 5) that have the highest relevance scores, or by choosing all content objects that have relevance scores greater than a predetermined value.

FIG. 6 illustrates a web page 602 having a widget plugin interface 640 that provides links 642, 644, 646 to additional content relevant to a displayed web page 602 in accordance with embodiments of the invention. The web page 602 is displayed by, for example, the web browser 145 executing on the client computer 144 of FIG. 1. The web page 602 includes viewable information 604, which includes content 606, a list of recent visitors 630, and a list of personalized links 640 labeled "Just for You!". The content 606 includes a first article 610, e.g., a blog posting which includes a title and blog entry text 612, and a second article 620, e.g., another blog posting, which includes a title and another blog entry 622. The blog entries 612, 622 are, for example, Hypertext Markup Language (HTML)-format content that may include text, images, and other types of media objects.

The links 640 are relevant the content 606 that is displayed on the web page 602 and also relevant to the interests of the user visiting the web page 602. The links 640 are, in one example, HTML links to other web pages. The links 640 are displayed as part of the web page 602, and are added to the web page 602 by the widget plugin 156 of FIG. 1. The relevancy between the links 640 and the content 606 may be established by the existence of similar or identical words, phrases, or other types of content in both the links 640 and the content 606. The relevancy between the links 640 and the interests of the user visiting the web page 602 may be established by the existence of similar or identical words or phrases in both the links 640 and tags in the user's profile. In one example, the widget plugin 156 generates the links based upon an intersection between tags associated with the user and words in the content 606 and/or tags associated with the content 606. The first link 642 is a link to an article that is similar to or the same as the blog posting 610, and may have been generated, for example, because the user's profile includes a tag "mortgage". The links 644, 646 are similarly relevant to the content 606 and to the tags in the user's profile.

Figure 7:
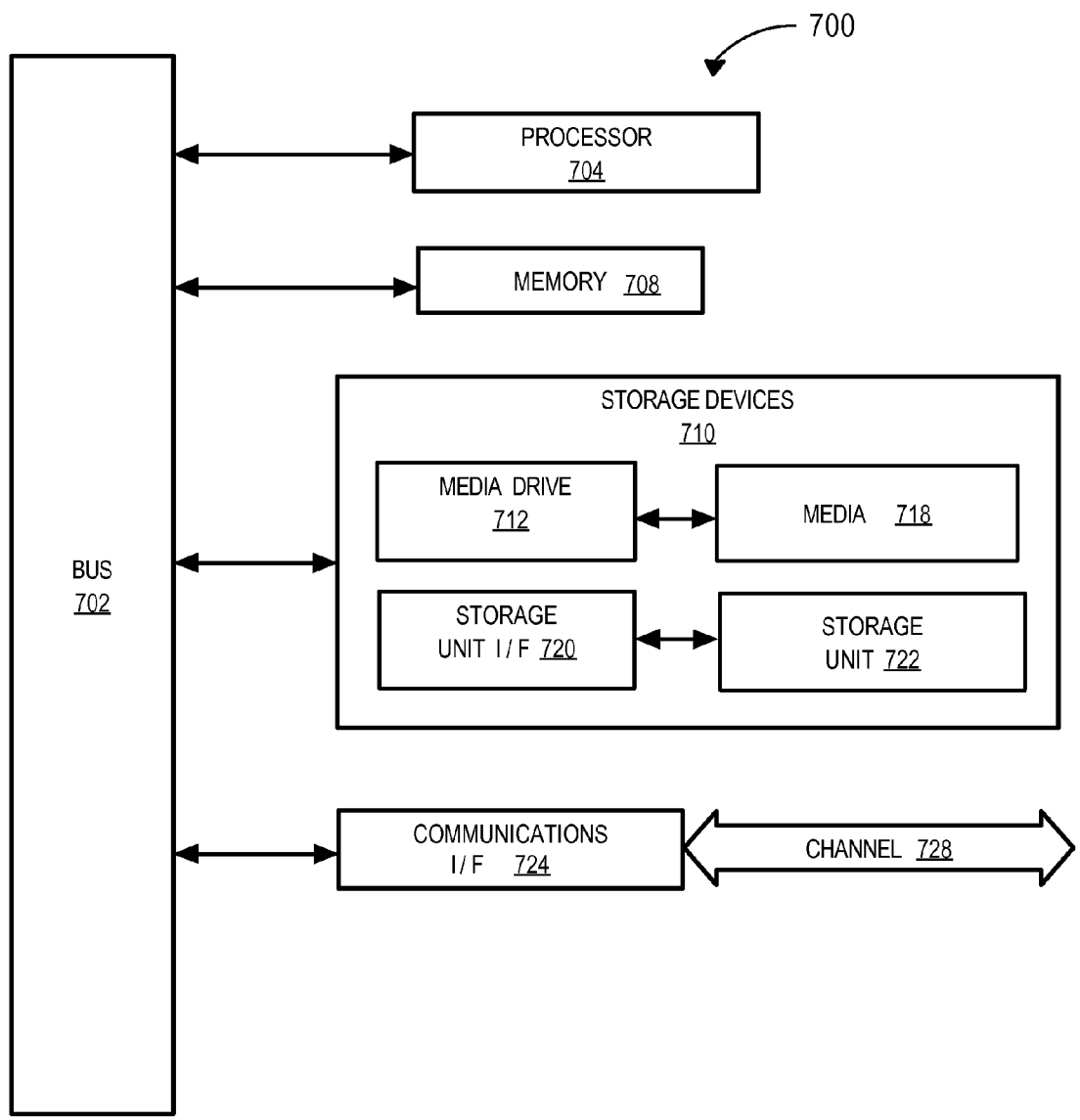
FIG. 7 illustrates a typical computing system that may be employed to implement processing functionality in embodiments of the invention.

FIG. 7 illustrates a typical computing system 700 that may be employed to implement processing functionality in embodiments of the invention. Computing systems of this type may be used in clients and servers, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718, may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may be involved in storing one or more instructions for use by processor 704, to cause the processor to perform specified operations. Such instructions, generally referred to as "computer program code" (which may be grouped in the form of computer programs or other groupings), when executed, enable the computing system 700 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate. It must also be noted that, as used in this specification and the appended claims, the singular forms "a," "an" and "the" include plural referents unless the context clearly dictates otherwise.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

The invention claimed is:

1. A method comprising:
   receiving, by a computing device, activity history associated with a user from a network data source, the activity history comprising a description of a user action initiated by the user;
   generating, by the computing device, a first metadata item based upon the activity history;
   storing, by the computing device, the first metadata item as user profile information associated with the user in a user profile database in response to a number of times the first metadata item is generated in a defined time period being greater than a threshold value;
   providing, by the computing device, a link to a widget plugin for inclusion with content objects of a content server that is disparate from the computing device and the network data source, the widget plugin enables communication between the computing device and a client computer associated with the user, the widget plugin enables via the communication, scanning of content objects received by the client computer and automatic retrieval of a subset of the content objects relevant to the first metadata item;
   receiving, by the computing device, a request for user-related metadata relevant to the content objects of provided by the content server to the client computer in response to navigation of the user to a website of the content server;
   determining, by the computing device, that the first metadata item is relevant to the content objects;
   transmitting, by the computing device, the first metadata item to an entity that made the request;
   enabling, by the computing device via the provision of the widget plugin link, automatic retrieval of a subset of the content objects that are relevant to the first metadata item for display to the user; and
   removing, by the computing device, the first metadata item from the user profile database in response to a number of times the first metadata item is generated in a defined time period being less than the threshold value.

2. The method of claim 1, wherein generating the first metadata item comprises:
   extracting, using the computing device, text from the activity history; and
   generating, using the computing device, the first metadata item based upon the text.

3. The method of claim 2, wherein generating comprises:
   using a stemming method to generate, using the computing device, a stem word based upon the text; and
   generating, using the computing device, the first metadata item based upon the stem word.

4. The method of claim 2, wherein generating the first metadata item based upon the text comprises:
   using a taxonomical lookup to generate, using the computing device, a taxonomical category of the text; and
   generating, using the computing device, the first metadata item based upon the taxonomical category.

5. The method of claim 4, wherein generating the first metadata item based upon the taxonomical category comprises:
   generating, using the computing device, the first metadata item, wherein the first metadata item comprises a name of the taxonomical category.

6. The method of claim 4, wherein generating the first metadata item based upon the taxonomical category comprises:
   generating, using the computing device, the first metadata item, wherein the first metadata item comprises a name of an object in the taxonomical category.

7. The method of claim 1, wherein the first metadata item comprises a tag.

8. The method of claim 1, wherein the activity history comprises a description of a user action in which the user creates online content, provides online content to the network data source, shares a web link with another user, applies a tag to another user, receives online content, or a combination thereof.

9. The method of claim 1, further comprising:
   generating, using the computing device, a profile vector for the user based upon their activity history; and
   storing the profile vector in the user profile.

10. The method of claim 9, wherein the profile vector is based upon a content object and the first metadata item.

11. The method of claim 1, further comprising:
    adding, using the computing device, a web link to the web content as a reference to the content object in response to the content object being relevant to the first metadata item; and
    providing, using the computing device, the web content to the user.

12. The method of claim 11, wherein determining if the first metadata item is relevant to the content object comprises:
    generating, using the computing device, a content vector based upon the content object;
    generating, using the computing device, a profile vector based upon the first metadata item; and
    performing, using the computing device, a similarity operation to compare the content vector to the profile vector.

13. The method of claim 12, wherein the content vector comprises numeric weight values based upon the content object, and the profile vector comprises numeric weight values based upon the first metadata item.

14. The method of claim 11, wherein determining if the first metadata item is relevant to the content object comprises:
    retrieving, using the computing device, a second metadata item associated with the content object,
    wherein the first metadata item is relevant to the content object in response to the first metadata item being relevant to the second metadata item.

15. The method of claim 11, wherein determining if the first metadata item is relevant to the content object comprises:
    generating, using the computing device, a relevance score based upon a similarity of the first metadata item to the content object,
    wherein the first metadata item is relevant to the content object in response to the relevance score being at least a threshold value.

16. The method of claim 15, wherein the threshold value is based upon a type of the activity history.

17. The method of claim 11, wherein determining if the first metadata item is relevant to the content object comprises:

generating, using the computing device, a recency score based upon recency in time of a date on which the first metadata item is accessed and of a date on which the content object is accessed,
wherein the first metadata item is relevant to the content object in response to the recency score being at least a threshold value.

18. The method of claim 11, wherein the content object comprises a web page.

19. The method of claim 1, wherein the threshold value is based upon a type of the activity history.

20. A non-transitory computer readable storage medium for tangibly storing thereon computer readable instructions for a method comprising:
receiving, at a computing device, activity history associated with a user from a network data source, the activity history comprising a description of a user action initiated by the user;
generating, by the computing device, a first metadata item based upon the activity history;
storing, by the computing device, the first metadata item as user profile information associated with the user in a user profile database in response to a number of times the first metadata item is generated in a defined time period being greater than a threshold value;
providing, by the computing device, a link to a widget plugin for inclusion with content objects of a content server that is disparate from the computing device and the network data source, the widget plugin enables communication between the computing device and a client computer associated with the user, the widget plugin enables via the communication, scanning of content objects received by the client computer and automatic retrieval of a subset of the content objects relevant to the first metadata item;
receiving, by the computing device, a request for user-related metadata relevant to the content objects of provided by the content server to the client computer in response to navigation of the user to a website of the content server;
determining, by the computing device, that the first metadata item is relevant to the content objects;
transmitting, by the computing device, the first metadata item to an entity that made the request;
enabling, by the computing device via the provision of the widget plugin link, automatic retrieval of a subset of the content objects that are relevant to the first metadata item for display to the user; and
removing, by the computing device, the first metadata item from the user profile database in response to a number of times the first metadata item is generated in a defined time period being less than the threshold value.

21. The non-transitory computer readable storage medium of claim 20, wherein generating the first metadata item comprises:
extracting text from the activity history; and
generating the first metadata item based upon the text.

22. The non-transitory computer readable storage medium of claim 21, wherein generating the first metadata item based upon the text comprises:
using a stemming method to generate a stem word based upon the text; and
generating the first metadata item based upon the stem word.

23. The non-transitory computer readable storage medium of claim 21, wherein generating the first metadata item based upon the text comprises:
using a taxonomical lookup to generate a taxonomical category of the text; and
generating the first metadata item based upon the taxonomical category.

24. The non-transitory computer readable storage medium of claim 23, wherein generating the first metadata item based upon the taxonomical category comprises:
generating the first metadata item, wherein the first metadata item comprises a name of the taxonomical category.

25. The non-transitory computer readable storage medium of claim 23, wherein generating the first metadata item based upon the taxonomical category comprises:
generating the first metadata item, wherein the first metadata item comprises a name of an object in the taxonomical category.

26. The non-transitory computer readable storage medium of claim 20, wherein the first metadata item comprises a tag.

27. The non-transitory computer readable storage medium of claim 20, wherein the activity history comprises a description of a user action in which the user creates online content, provides online content to the network data source, shares a web link with another user, applies a tag to another user, receives online content, or a combination thereof.

28. The non-transitory computer readable storage medium of claim 20, further comprising:
generating a profile vector for the user based upon the user's activity history; and
storing the profile vector in the user profile.

29. The non-transitory computer readable storage medium of claim 28, wherein the profile vector is based upon a content object and the first metadata item.

30. The non-transitory computer readable storage medium of claim 20, further comprising:
adding a web link to the web content as a reference to the content object in response to the content object being relevant to the first metadata item; and
providing the web content to the user.

31. The non-transitory computer readable storage medium of claim 30, wherein determining if the first metadata item is relevant to the content object comprises:
generating a content vector based upon the content object;
generating a profile vector based upon the first metadata item; and
performing a similarity operation to compare the content vector to the profile vector.

32. The non-transitory computer readable storage medium of claim 31, wherein the content vector comprises numeric weight values based upon the content object, and the profile vector comprises numeric weight values based upon the first metadata item.

33. The non-transitory computer readable storage medium of claim 30, wherein determining if the first metadata item is relevant to the content object comprises:
retrieving a second metadata item associated with the content object,
wherein the first metadata item is relevant to the content object in response to the first metadata item being relevant to the second metadata item.

34. The non-transitory computer readable storage medium of claim 30, wherein determining if the first metadata item is relevant to the content object comprises:
generating a relevance score based upon a similarity of the first metadata item to the content object,
wherein the first metadata item is relevant to the content object in response to the relevance score being at least a threshold value.

35. The non-transitory computer readable storage medium of claim 34, wherein the threshold value is based upon a type of the activity history.

36. The non-transitory computer readable storage medium of claim 30, wherein determining if the first metadata item is relevant to the content object comprises:
generating a recency score based upon recency in time of a date on which the first metadata item is accessed and of a date on which the content object is accessed,
wherein the first metadata item is relevant to the content object in response to the recency score being at least a threshold value.

37. The non-transitory computer readable storage medium of claim 30, wherein the content object comprises a web page.

38. The non-transitory computer readable storage medium of claim 20, wherein the threshold value is based upon a type associated with the activity history.

39. A system comprising:
a computer memory for storing instructions; and
a processor for executing the instructions, the instructions for:
receiving activity history associated with a user from a network data source, the activity history comprising a description of a user action initiated by the user;
generating a first metadata item based upon the activity history;
storing the first metadata item as user profile information associated with the user in a user profile database in response to a number of times the first metadata item is generated in a defined time period being greater than a threshold value;
providing a link to a widget plugin for inclusion with content objects of a content server that is disparate from the computing device and the network data source, the widget plugin enables communication between the computing device and a client computer associated with the user, the widget plugin enables via the communication, scanning of content objects received by the client computer and automatic retrieval of a subset of the content objects relevant to the first metadata item;
receiving a request for user-related metadata relevant to the content objects of provided by the content server to the client computer in response to navigation of the user to a website of the content server;
determining that the first metadata item is relevant to the content objects;
transmitting the first metadata item to an entity that made the request;
enabling via the provision of the widget plugin link, automatic retrieval of a subset of the content objects that are relevant to the first metadata item for display to the user; and
removing the first metadata item from the user profile database in response to a number of times the first metadata item is generated in a defined time period being less than the threshold value.

40. The system of claim 1, wherein generating the first metadata item comprises:
extracting text from the activity history; and
generating the first metadata item based upon the text.

41. The system of claim 40, wherein generating the first metadata item based upon the text comprises:
using a stemming method to generate a stem word based upon the text; and
generating the first metadata item based upon the stem word.

42. The system of claim 40, wherein generating the first metadata item based upon the text comprises:
using a taxonomical lookup to generate a taxonomical category of the text; and
generating the first metadata item based upon the taxonomical category.

43. The system of claim 42, wherein generating the first metadata item based upon the taxonomical category comprises:
generating the first metadata item, wherein the first metadata item comprises a name of the taxonomical category.

44. The system of claim 42, wherein generating the first metadata item based upon the taxonomical category comprises:
generating the first metadata item, wherein the first metadata item comprises a name of an object in the taxonomical category.

45. The system of claim 39, wherein the first metadata item comprises a tag.

46. The system of claim 39, wherein the activity history comprises a description of a user action in which the user creates online content, provides online content to the network data source, shares a web link with another user, applies a tag to another user, receives online content, or a combination thereof.

47. The system of claim 39, further comprising:
generating a profile vector for the user based upon their activity history; and storing the profile vector in the user profile.

48. The system of claim 47, wherein the profile vector is based upon a content object and the first metadata item.

49. The system of claim 39, further comprising:
adding a reference to the content object in response to the content object being relevant to the first metadata item; and
providing the content to the user.

50. The system of claim 49, wherein determining if the first metadata item is relevant to the content object comprises:
generating a content vector based upon the content object;
generating a profile vector based upon the first metadata item; and
performing a similarity operation to compare the content vector to the profile vector.

51. The system of claim 50, wherein the content vector comprises numeric weight values based upon the content object, and the profile vector comprises numeric weight values based upon the first metadata item.

52. The system of claim 50, wherein determining if the first metadata item is relevant to the content object comprises:
retrieving a second metadata item associated with the content object,
wherein the first metadata item is relevant to the content object in response to the first metadata item being relevant to the second metadata item.

53. The system of claim 49, wherein determining if the first metadata item is relevant to the content object comprises:
generating a relevance score based upon a similarity of the first metadata item to the content object,
wherein the first metadata item is relevant to the content object in response to the relevance score being at least a threshold value.

54. The system of claim 53, wherein the threshold value is based upon a type of the activity history.

55. The system of claim 49, wherein determining if the first metadata item is relevant to the content object comprises:
generating a recency score based upon recency in time of a date on which the first metadata item is accessed and of a date on which the content object is accessed, wherein the first metadata item is relevant to the content object in response to the recency score being at least a threshold value.

56. The system of claim 49, wherein the content object comprises a web page.

57. The system of claim 55, wherein the threshold value is based upon a type of the activity history.

58. A method comprising:
- accessing, by a computing device, a website hosted on a webserver;
- receiving, by the computing device, a widget plugin and content objects from the website, the widget plugin enables communication between the computing device and a user interest server;
- sending automatically via the widget plugin, by the computing device to the user interests server disparate from the website, a request for user-related metadata relevant to content of the website;
- receiving, by the computing device, a first metadata item generated from a user's activity history a predetermined number of times within a defined time period, the predefined number of times being greater than a threshold value;
- determining, by the computing device, a subset of the content objects that are relevant to the first metadata item for display to the user, the determination is based on a scan of the received content objects by the widget plugin; and
- displaying, by the computing device, the subset of content objects in a user interface of the widget plugin.

* * * * *